United States Patent
Weaver et al.

(10) Patent No.: US 12,051,906 B2
(45) Date of Patent: Jul. 30, 2024

(54) WIND TURBINE POWER PHASE CONTROL WITH DC COLLECTION BUS FOR ONSHORE/OFFSHORE WINDFARMS

(71) Applicants: National Technology & Engineering Solutions of Sandia, LLC, Alubquerque, NM (US); Michigan Technological University, Houghton, MI (US)

(72) Inventors: Wayne W. Weaver, Hancock, MI (US); David G. Wilson, Tijeras, NM (US); Rush D. Robinett, III, Tijeras, NM (US)

(73) Assignees: National Technology & Engineering Solutions of Sandia, LLC, Albuquerque, NM (US); Michigan Technological University, Houghton, MI (US)

(*) Notice: Subject to any disclaimer, the term of this patent is extended or adjusted under 35 U.S.C. 154(b) by 26 days.

(21) Appl. No.: 17/684,665

(22) Filed: Mar. 2, 2022

(65) Prior Publication Data

US 2023/0283079 A1    Sep. 7, 2023

(51) Int. Cl.
*H02J 3/38*    (2006.01)
*F03D 9/11*    (2016.01)
*F03D 9/25*    (2016.01)

(52) U.S. Cl.
CPC .............. *H02J 3/381* (2013.01); *F03D 9/11* (2016.05); *F03D 9/257* (2017.02); *H02J 2300/28* (2020.01)

(58) Field of Classification Search
CPC ......... H02J 3/381; H02J 2300/28; F03D 9/11; F03D 9/257
See application file for complete search history.

(56) References Cited

U.S. PATENT DOCUMENTS

| | | | | |
|---|---|---|---|---|
| 3,838,330 A | * | 9/1974 | Rosa ..................... | H02M 7/757 363/137 |
| 4,006,398 A | * | 2/1977 | Gritter .................... | H02P 9/46 322/94 |
| 4,122,512 A | * | 10/1978 | Peterson ............... | H02M 7/757 505/868 |

(Continued)

OTHER PUBLICATIONS

Weaver, W. W. et al., "DC Bus Collection of Type-4 Wind Turbine Farms with Phasing Control to Minimize Energy Storage," 20th Wind Integration Workshop, International Workshop on Large-Scale Integration of Wind Power into Power Systems as well as on Transmission Networks for Offshore Wind Power Plants, Sep. 29-30, 2021, Berlin, Germany, 7 pages.

(Continued)

*Primary Examiner* — Daniel Kessie
*Assistant Examiner* — Brian K Baxter
(74) *Attorney, Agent, or Firm* — Kevin W. Bieg

(57) ABSTRACT

A DC bus collection system for a wind farm reduces the overall required number of converters and minimizes the energy storage system requirements. The DC bus collection system implements a power phasing control method between wind turbines that filters the variations and improves power quality. The phasing control method takes advantage of a novel power packet network concept with nonlinear power flow control design techniques that guarantees both stable and enhanced dynamic performance.

6 Claims, 10 Drawing Sheets

(56) References Cited

U.S. PATENT DOCUMENTS

| | | | | |
|---|---|---|---|---|
| 4,242,628 A * | 12/1980 | Mohan | ............... | H02P 9/46 290/55 |
| 5,798,632 A * | 8/1998 | Muljadi | ............... | F03D 9/25 322/29 |
| 6,285,090 B1 * | 9/2001 | Brutsaert | ............... | H02K 7/1838 290/55 |
| 6,448,735 B1 * | 9/2002 | Gokhale | ............... | H02P 27/05 318/705 |
| 7,554,302 B2 * | 6/2009 | Schauder | ............... | H02P 23/08 322/59 |
| 8,574,741 B2 * | 11/2013 | Sato | ............... | H01M 10/4207 429/93 |
| 10,890,160 B2 * | 1/2021 | Wang | ............... | F03D 9/11 |
| 2011/0199042 A1 * | 8/2011 | Abe | ............... | H02J 7/007194 320/136 |
| 2011/0206955 A1 * | 8/2011 | Hirai | ............... | H02J 3/381 429/50 |
| 2011/0282807 A1 * | 11/2011 | Colello | ............... | H02J 3/008 320/128 |
| 2013/0271083 A1 * | 10/2013 | Williams | ............... | H02J 3/28 320/128 |
| 2014/0028102 A1 * | 1/2014 | Frampton | ............... | H02J 3/466 307/80 |
| 2014/0265607 A1 * | 9/2014 | Peting | ............... | H02J 3/36 307/82 |
| 2016/0036221 A1 * | 2/2016 | Pan | ............... | H02J 3/36 307/52 |
| 2017/0045035 A1 * | 2/2017 | Das | ............... | F03D 9/257 |
| 2017/0126010 A1 * | 5/2017 | Canales | ............... | H02J 1/102 |
| 2017/0133879 A1 * | 5/2017 | Eckhardt | ............... | H02J 13/00004 |
| 2018/0054140 A1 * | 2/2018 | Chen | ............... | H02J 3/381 |
| 2018/0102646 A1 * | 4/2018 | Apte | ............... | H02S 20/00 |
| 2018/0366952 A1 * | 12/2018 | Wilson | ............... | H02J 3/38 |
| 2019/0140563 A1 * | 5/2019 | Kalygin | ............... | H02P 1/26 |
| 2020/0059102 A1 * | 2/2020 | Brombach | ............... | H02J 1/102 |
| 2021/0363968 A1 * | 11/2021 | Holliday, III | ............... | F03D 7/0272 |
| 2022/0349382 A1 * | 11/2022 | Palomares Rentero | ............... | F03D 1/00 |
| 2022/0399740 A1 * | 12/2022 | Serafica | ............... | H02J 7/02 |
| 2023/0175490 A1 * | 6/2023 | Altun | ............... | F03D 7/048 416/1 |
| 2023/0250804 A1 * | 8/2023 | Farb | ............... | F03D 7/048 |

OTHER PUBLICATIONS

Wilson, D. G. et al., "WEC Arrays with Power Packet Networks for Efficient Energy Storage and Grid Integration," IEEE/MTS Oceans I(I), 1 (2021), 8 pages.

Wilson, D. G. et al., U.S. Appl. No. 17/675,064, filed Feb. 18, 2022.

* cited by examiner

WIND TURBINE POWER PHASE CONTROL WITH DC COLLECTION BUS FOR ONSHORE/OFFSHORE WINDFARMS

STATEMENT OF GOVERNMENT INTEREST

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosure is submitted under 35 U.S.C. 102(b)(1)(A): Wayne W. Weaver, David G. Wilson, Rush D. Robinett III, and Joseph Young, "DC Bus Collection of Type-4 Wind Turbine Farms with Phasing Control to Minimize Energy Storage," 20$^{th}$ Wind Integration Workshop, International Workshop on Large-Scale Integration of Wind Power into Power Systems as well as on Transmission Networks for Offshore Wind Power Plants, 29-30 Sep. 2021, Berlin, Germany. The subject matter of this disclosure was conceived of or invented by the inventors named in this application.

FIELD OF THE INVENTION

The present invention relates to wind energy technology and, in particular, to a wind turbine power phase control with DC collection bus for onshore/offshore wind farms.

BACKGROUND OF THE INVENTION

A large number of countries are striving to provide a more less carbon-based energy mix economy that is sustainable and secure. Both the European Union (EU) and the United States (US) are projecting large increases in renewable resources to help meet green energy strategies. For example, in the EU the overall goal by 2030 is to be able to share renewable resources in total energy consumption. In the US, the Department of Energy (DOE), Office of Energy Efficiency and Renewable Energy (EERE) mission is to provide a clean energy economy (carbon-neutral) by 2050. Increased investments in research and development will bridge this transition with new technologies.

In the last decade wind energy has shown a large growth in installed capacity worldwide. With the introduction of large volumes of renewable energy (RE) integration into the electric power grid (EPG), continued challenges need to be addressed in maintaining reliable grid operations and dynamic stability due to variable generation. Variable power flows due to REs increase the need for reactive power or energy storage system (ESS) capacity due to both decreased conventional generation and non-collocated RE systems (e.g., offshore wind farms) with load centers requiring long distance transmission infrastructures. See A. Jain et al., *Wind Energy Sci. Discuss.* 2020, 1 (2020).

Near-term energy systems are becoming more distributed and decentralized requiring transmission infrastructures for growing bulk power transfer. Innovative approaches will be required to improve power quality, minimize the number of power electronic components, and reduce ESS requirements. Future power scenarios include offshore wind energy as an important generation source. Numerous researchers are exploring a vast array of approaches to help solve these problems. See A. Fernandez-Guillamon et al., *J. Mar. Sci. Eng.* 7(11), 399 (2019); F. Blaabjerg and Z. Chen, *Synth. Lect. Power Electron.* 1(1), 1 (2005); J. P. Daniel et al, *National offshore wind energy grid interconnection study*, ABB Inc, Tech. Rep., 2014; M. Fischer et al., *IET Renew. Power Gener.* 10(1), 17 (2016); D. Nayanasiri and Y. Li, *IET Renew. Power Gener.* 15(12), 2766 (2021); L. H. Kocewiak, *Harmonics in large offshore wind farms*. Department of Energy Technology, Aalborg University, 2012; A. Roscoe et al., "Practical experience of providing enhanced grid forming services from an onshore wind park." in Proc. Wind Integration Workshop, 2020; A. Roscoe et el., "Practical experience of operating a grid forming wind park and its response to system events." in *Proc. Wind Integration Workshop, Dublin. Ireland,* 2019, pp. 16-18; and S. Shah and V. Gevorgian, "Control, operation, and stability characteristics of grid-forming type iii wind turbines," National Renewable Energy Lab., Golden, Colo. (United States), Tech. Rep., 2020. This new technology is less tolerant to voltage quality disturbances and with widespread use of power electronic converters will contribute to the relevance of power quality. See V. Akhmatov, Wind Energy 12(7), 692 (2009); and F. Blaabjerg and Z. Chen; *Synth. Lect. Power Electron.* 1(1), 1 (2005). It continues to be critically important to assess the inevitable impact that wind farms have on power quality.

SUMMARY OF THE INVENTION

The present invention is directed a wind farm, comprising a plurality of wind turbines, each wind turbine comprising a rotor for capturing wind energy and converting the wind energy into a rotary motion, an electrical induction machine for converting the rotary motion to an alternating current, an AC/DC converter for converting the alternating current to a direct current, and a controller for controlling an individual time delay of the direct current from the wind turbine that is phased with respect to a time delay of a direct current from each of the other wind turbines of the plurality of wind turbines; a DC collection bus for collecting the time-delayed direct current generated by each of the plurality of wind turbines that are phased over a total phase delay time of the plurality of wind turbines; and an energy storage system for regulating a voltage of the DC collection bus, wherein the total phase delay time of the plurality of wind turbines is selected to minimize an energy storage capacity required of the energy storage system for the DC collection bus to maintain a constant voltage. The controller can comprise a slip control to control the torque of the electrical induction machine.

A DC collection system that utilizes a time delay phasing control of turbines can significantly reduce the ESS requirements. A traditional type-4 wind farm with N turbines will result in 2N power converters. Beneficially, the DC collection approach of the present invention will lead to N+2 number of converters, one for each turbine, one for the ESS and one for the grid-connected converter. Further, it is anticipated that incorporation of blade-pitch control of the turbines can also lead to more improvements. The reduction in the number of converters, along with the minimization of the ESS and improved power quality to the grid will likely yield a substantial cost savings to the wind farm owner/operator.

BRIEF DESCRIPTION OF THE DRAWINGS

The detailed description will refer to the following drawings, wherein like elements are referred to by like numbers.

DETAILED DESCRIPTION OF THE INVENTION

The present invention is directed to a novel approach to an effective DC bus collection system for a wind farm. The DC collection implements a power phasing control method between turbines that filters the variations and improves power quality while reducing the size and amount of ESS hardware. The phasing control takes advantage of a novel power packet network (PPN) concept with nonlinear power flow control design techniques that guarantees both stable and enhanced dynamic performance. See D. G. Wilson et al., "WEC arrays with power packet networks for efficient energy storage and grid integration," in *IEEE/MTS OCEANS* 1(1), 1 (2021); and U.S. patent application Ser. No. 17/675,064, filed Feb. 18, 2022; which are incorporated herein by reference. As will be described below, a system model can be defined that captures the critical coupled dynamics of the mechanical-electrical wind farm system. The mechanical-electrical wind turbine coupled models use an exemplary Type IV generator system as part of a DC collective. A numerical simulation example is presented for a wind farm and DC collective topology. Power electronic and ESS component reductions for efficient power quality metrics are described, with the tradeoff being a slightly diminished power to the electrical grid.

System Models

Figure 1:
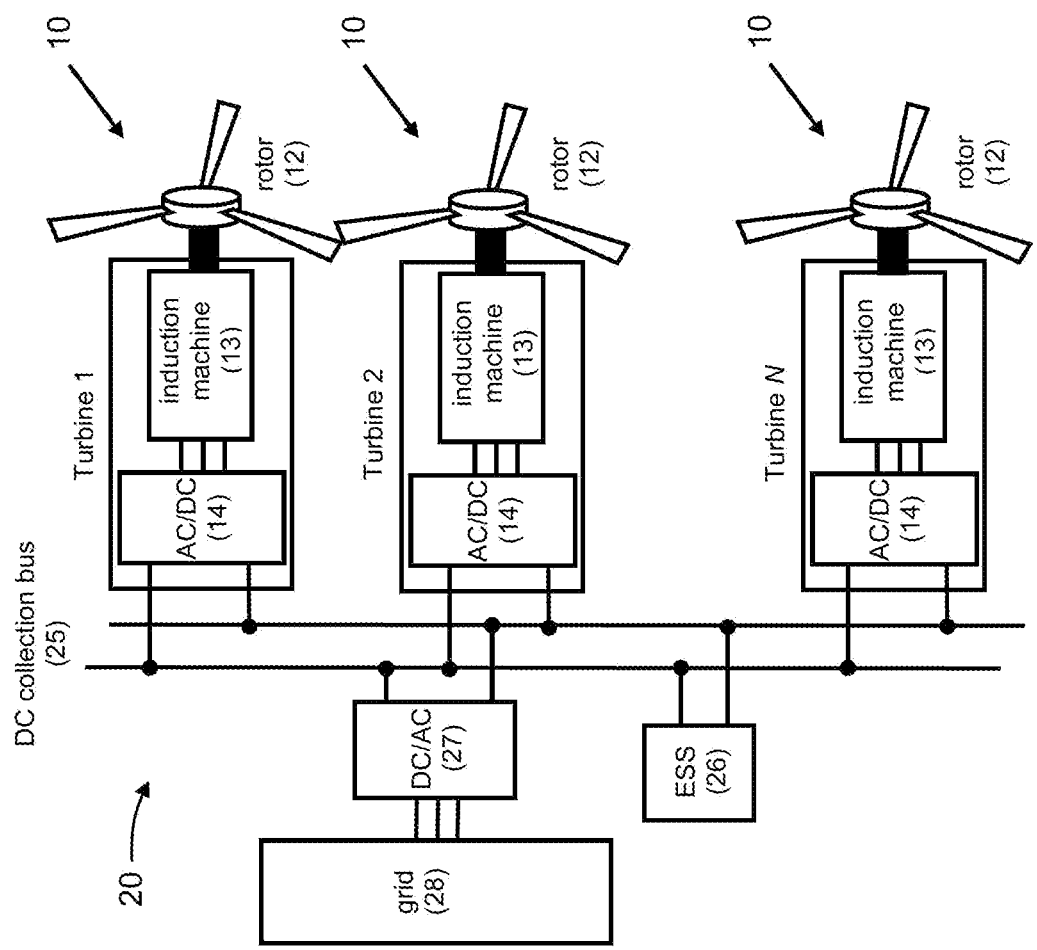
FIG. 1 is a schematic illustration of a wind farm model with a DC collection bus and energy storage system (ESS).

A schematic illustration of a wind farm 20 is shown in FIG. 1. The exemplary wind farm comprises a plurality N of wind turbines 10, each turbine 10 having a rotor 12, an electrical induction machine 13 and a an AC/DC converter 14, connected to a common DC collection bus 25. Also connected to the bus 25 is a generic ESS device 26 that regulates the DC voltage of the bus 25, as well as a DC/AC converter 27 connected to an electrical grid 28. Only the DC side of the grid-connected DC/AC converter 27 is considered herein. The AC dynamics of the grid are not modeled. Further, all power converters are modeled as average-mode behavior and switching effects are not considered. The following sections describe the models for the individual components including the aerodynamics of the turbine, the electrical induction machine, AC/DC converter, DC bus, ESS, and grid-connected DC/AC converter.

Turbine and Aerodynamic Model

The aerodynamic power from each of the wind turbines 10 shown in FIG. 1 is approximated as $$P_a = 1/2 \rho \pi R^2 C_p(\gamma) v^3 \tag{1}$$

where $\rho$ is the density of air, R is the rotor radius, v is the wind velocity, and $C_p(\gamma)$ is the power coefficient, which is a function of the tip-speed ratio $$\gamma = \frac{R}{v} \omega_r. \tag{2}$$

Figure 2:
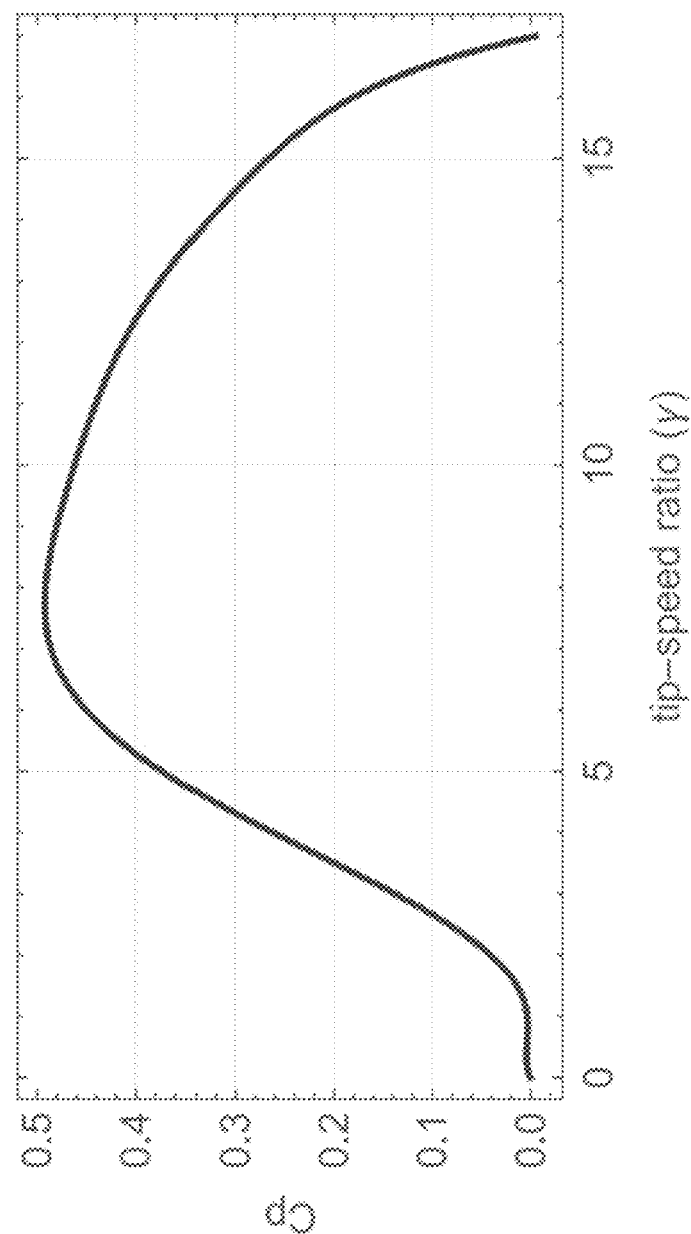
FIG. 2 is a graph of the power coefficient of a Vestas v27 wind turbine.

The power coefficient curve of the exemplary Vestas v27 wind turbine is shown in FIG. 2.

The aerodynamic torque from the turbine can then be found from $$T_a = \frac{P_a}{\omega_r} = \frac{1}{2\omega_r} \rho \pi R^2 C_p(\gamma) v^3 \tag{3}$$

$$= \frac{1}{2} \rho \pi R^3 C_p(\gamma) v^2$$

It should be noted that the pitch of the turbine blades also plays a significant role in the aerodynamic torque $T_a$ and power coefficient $C_p$. However, pitch control was not included in the model.

Then, the rotational dynamics of the turbine are approximated as $$J_{turbine} \dot{\omega}_r = T_a - GRT_e - \omega_r B \tag{4}$$

where $J_{turbine}$ is the rotational moment-of-inertia of the rotor, B is the frictional damping coefficient, $T_e$ is the electrical torque from the induction machine and GR is the gearbox ratio. The moment-of-inertia of the turbine is estimated as that of a cylindrical hub with the blades modeled as rods rotating about their ends given as $$J_{turbine} = J_{hub} + 3 J_{blade} \tag{5}$$

$$= \left(\frac{1}{2} M_{hub} R_{hub}^2\right) + 3\left(\frac{1}{3} M_{blade} R_{blade}^2\right)$$

where $M_{hub}$ and $R_{hub}$ are the mass and radius of the hub respectively and $M_{blade}$ and $R_{blade}$ are the mass and radius of the blades. Values for the turbine parameters are taken from the Vestas v27-225 product specification See "Vestas v27-225 general specification," https://backend orbit.dtu.dk/ws/portalfiles/portal/51244107/ris_m_286 I.pdf, accessed: 2021-08-11. Table I shows model parameter values and descriptions of the turbine used in the model.

TABLE I

Turbine Rotor Model Parameters

| Parameter | Description | Value |
| --- | --- | --- |
| $\rho$ | Density of air | 1.2 kg/m$^3$ |
| R | Rotor radius | 13.5 m |

TABLE I-continued

Turbine Rotor Model Parameters

| Parameter | Description | Value |
|---|---|---|
| J | Rotor moment of inertia | 109,900 kg m² |
| B | Friction damping coefficient | 565 Nm/rad/s |
| GR | Gear ratio | 38.8 |
| $\gamma_{opt}$ | Optimal tip-speed ratio for max power | 7.7 |

Induction Machine and Converter Model

An AC induction machine having a squirrel-cage type rotor was chosen as an exemplary electrical induction machine 13. Further, a specific machine, ABB IDDRPM364004RI, was chosen as the basis of the model and parameters given its power and speed ratings. See "ABB/Baldor product catalog," https://www.baldorcomi-catalog/IDDRPM364004RI, accessed: 2021-08-11. The differential equating model of the squirrel-cage induction machine are $$\dot{\lambda}_{ds} = v_{ds} - R_s i_{ds} + \omega_s \lambda_{qs} \quad (6)$$

$$\dot{\lambda}_{qs} = v_{qs} - R_s i_{qs} - \omega_s \lambda_{ds} \quad (7)$$

$$\dot{\lambda}_{dr} = 0 - R_r i_{dr} + (\omega_s - p\omega_m)\lambda_{qr} \quad (8)$$

$$\dot{\lambda}_{qr} = 0 - R_r i_{ds} - (\omega_s - p\omega_m)\lambda_{dr} \quad (9)$$

where the state $\lambda_{ds}$, $\lambda_{qs}$, $\lambda_{dr}$, $\lambda_{qr}$ are the flux linkages of the stator d-axes, stator q-axes, rotor d-axes and rotor q-axes, respectively. See P. C. Krause et al., *Analysis of electric machinery and drive systems*, John Wiley & Sons, 2013, vol. 75. The synchronous speed of the induction machine is cos and the mechanical rotor speed is $\omega_m$. The flux linkages can be mapped to the winding currents as $$\lambda_{ds} = L_{ls} i_{ds} + L_m (i_{ds} + i_{dr}) \quad (10)$$

$$\lambda_{qs} = L_{ls} i_{qs} + L_m (i_{qs} + i_{qr}) \quad (11)$$

$$\lambda_{dr} = L_{lr} i_{dr} + L_m (i_{ds} + i_{dr}) \quad (12)$$

$$\lambda_{qr} = L_{lr} i_{qr} + L_m (i_{qs} + i_{qr}) \quad (13)$$

The electrical torque on the machine shaft is $$T_e = p L_m (i_{qs} i_{qr} - i_{ds} i_{qr}). \quad (14)$$

Further descriptions and model parameters for this model are given in Table II.

TABLE II

Induction Machine Model Parameters

| Parameter | Description | Value |
|---|---|---|
| $R_s$ | Stator winding resistance | 9.57 mΩ |
| $R_r$ | Rotor winding resistance | 7.65 mΩ |
| $L_{ls}$ | Stator leakage inductance | 253 μH |
| $L_{lr}$ | Rotor leakage inductance | 253 μH |
| $L_m$ | Mutual inductance | 7.07 mH |
| p | Pole-pairs | 2 |

The average-mode reduced order model of the AC/DC converter 14 is based on Hassell et al. and is given as $$i_{ds} = \alpha(i_{ds}\cos(\delta) + i_{qs}\sin(\delta)) \quad (15)$$

$$v_{ds} = v_{dc}\alpha\cos(\delta) \quad (16)$$

$$v_{qs} = v_{dc}\alpha\sin(\delta) \quad (17)$$

where $\alpha$ is the gain and $\delta$ is the phase of the converter. See T. Hassell et al., "Modeling of inverter based ac microgrids for control development," in *IEEE Conference on Control Applications* 1(I), 1347 (2015). This model neglects switching effects and gives a simple form for use in the larger system model.

For this model, a volts-per-hertz control of the electrical induction machine 13 was implemented. See P. C. Krause et al., *Analysis of electric machinery and drive systems*. John Wiley & Sons, 2013, vol. 75. Torque is created when the magnetic field due to current acts against the magnetic flux in the machine. The volts-per-hertz control method controls the magnetic flux to keep it at its rated value that maximizes machine efficiency. The voltage gain a can be adjusted during operation to keep the turbine speed and voltage at a fixed ratio. Since the wind is changing the turbine speed and voltage need to change with it for optimal operation of the induction machine. For the induction machines in this model the optimal volts-per-hertz ratio is $\beta=1.22$ V/(rad/s). A slip control was implemented to control the torque of the electrical induction machine. In this approach there is a linear approximation between the slip frequency, $\omega_{slip}=(\omega_s-p\omega_m)$ and the electrical torque. The linear slip to torque relationship for this model is $k=T_e/\omega_{slip} \sim 315.3$ Nm/(rad/s).

DC Collection Bus and Energy Storage System Model

Each of the turbines 10 shown in FIG. 1 are connected to a common DC collection bus 25 which has the model $$\dot{v}_b = \sum_{n=1}^{N} i_{dc,n} - v_b/R_b + u_{ess} - i_{grid} \quad (18)$$

where $i_{dc,n}$ represents the DC currents from each of the turbine converters 14, $u_{ess}$ is the current injected from a generic ESS 26 and $i_{grid}$ is the DC current to the grid-connected converter 27 that serves as the point of common coupling to the larger electrical grid 28. The grid dynamics and AC modelling are not considered and $i_{grid}$ is set to a fixed value based on the total power generated by the turbines over the time horizon. The energy storage system is modeled as a simple current injection in order to make the ESS device 26 as general and storage-technology agnostic as possible. One of the objectives of the model is to establish a framework that can be used to generate the specifications for the ESS, including peak power and energy capacity. The frequency response and bandwidth of the ESS can be considered as well. Therefore, this model focuses on the energy needs of the system and not the energy capabilities of a specific storage technology, such as batteries or super-capacitors. See W. W. Weaver et al., "Wec array networked microgrid control design and energy storage system requirements," in *IEEE OCEANS*. IEEE, 2019, pp. 1-6; and W. W. Weaver et al., "Super capacitor energy storage system design for wave energy converter demonstration; in *IEEE Interna-* tional Symposium on Power Electronics, Electrical Drives, Automation and Motion. IEEE, 2020, pp. 564-570.

Electrical Phasing Control

Figure 3:
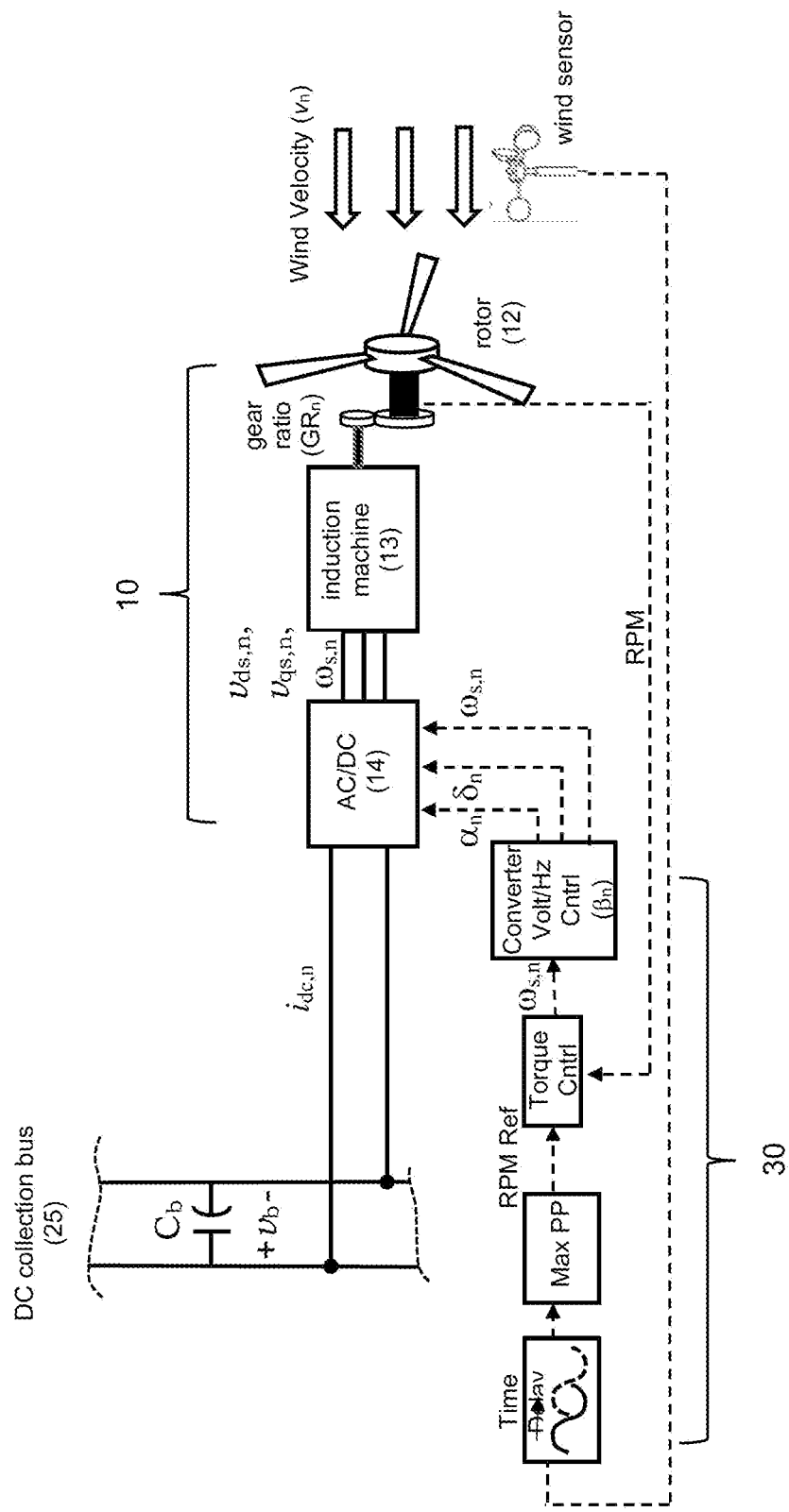
FIG. 3 is a schematic illustration of a wind turbine phase control system.

To harvest the maximum power from the wind turbine, the wind velocity v at the turbine can be measured with a wind sensor and used to calculate the optimal rotor speed based on the optimal tip speed ratio $\gamma_{opt}=7.7$ of the power coefficient $C_p$ from FIG. 2. The optimal aerodynamic torque is then found from Eqn. (3). Then, assuming the rotor to be in steady-state, the optimal electrical torque $T_e$ is found using Eqn. (4). The optimal electrical torque from the electrical induction machine is actuated through the slip control described in the section on Induction Machine and Converter Model. A diagram of this control system 30 for each individual turbine is shown in FIG. 3.

The ESS 26 injects the required current $u_{ess}$ to keep the bus voltage $v_b$ at a constant 460 $V_{dc}$ according to Eqn. (18). The current $i_{grid}$ to the grid-connected DC/AC converter 27 is set to inject the fixed maximum total power collected from the turbines over the period of interest. If the wind values are changing then the sum of powers from the turbines is fluctuating and the ESS must make up the difference to keep the bus voltage $v_b$ constant. However, if the powers injected to the DC bus 25 from the turbines 10 are phased over a period then there is less fluctuation in the total.

As described above, the optimal torque actuation for a turbine is based on the wind speed. Normally there is no delay in actuating the optimal torque reference. However, according to the present invention, a time delay (or phase shift) in the wind velocity signal v can be introduced into a maximum power point tracking control (Max PP) shown in FIG. 3. This time delay will cause a suboptimal power tracking or torque actuation on the turbine, but will also time shift the power injected $i_{dc,n}$ into the DC bus from the turbine. When the N turbines in a farm are all equally shifted and spaced over a total delay, then their power fluctuations tend to cancel which causes less effort on the ESS to maintain the bus voltage and thus minimizing the ESS requirements. For example, in a N=9 turbine system with a total time delay of 8 sec., the individual time delays for each of the nine turbines would be {0, 1, 2, 3, 4, 5, 6, 7, 8} sec., respectively. The time/phase delay value $\delta$ is chosen such that the energy storage on the DC bus is minimized. In this model, the time/phase delay was fixed, but could be varied in other control implementations.

Simulation Example

Figure 4:
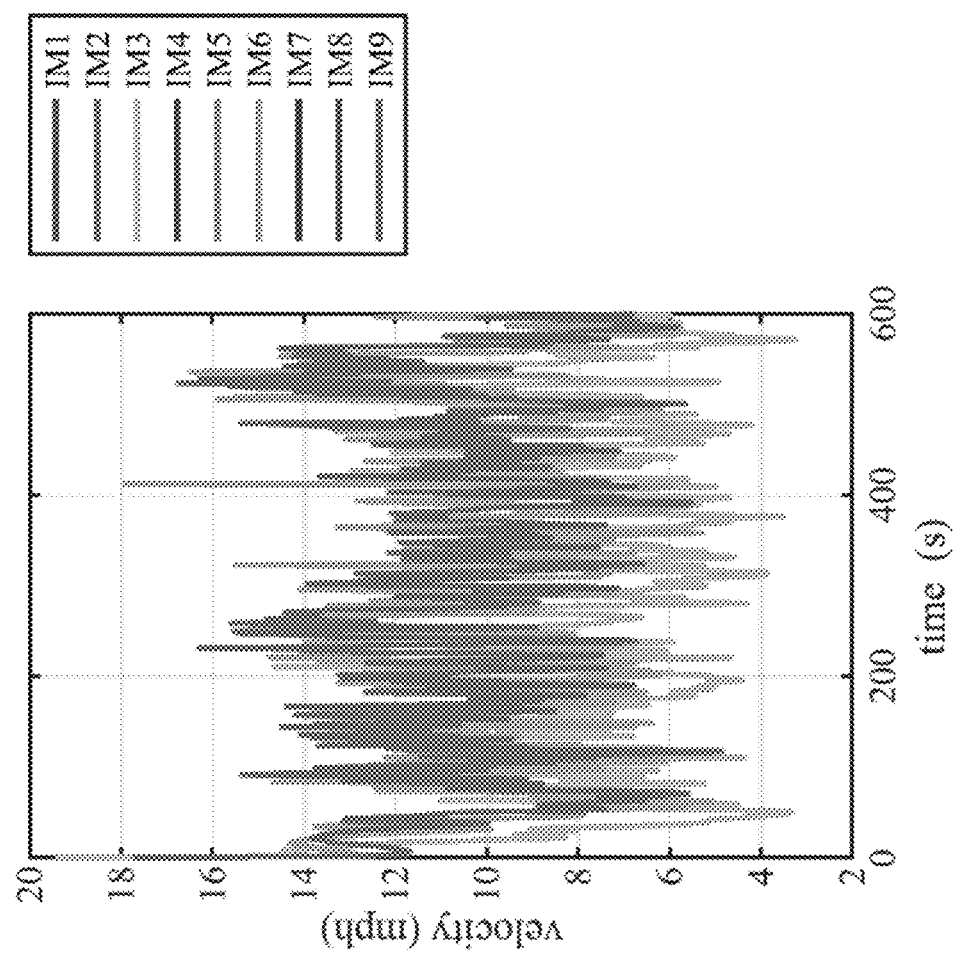
FIG. 4 is a graph of wind velocity profiles applied to a turbine/induction machine model.

To demonstrate the DC collection bus topology with time delay power phasing, a MATLAB/Simulink simulation was constructed from the models described in the System Models section and the control described in the Electrical Phasing Control section with nine turbines (N=9). Wind profiles were generated for the system using the NALU wind simulation package for a 600 s period. See M. A. Sprague et al., *J. Phys. Conf Ser.* 1452(1), 012071 (2020). The wind profile for each turbine and induction machine (IM) are shown in FIG. 4.

Baseline Time Delay Example of 0 sec

Figure 5:
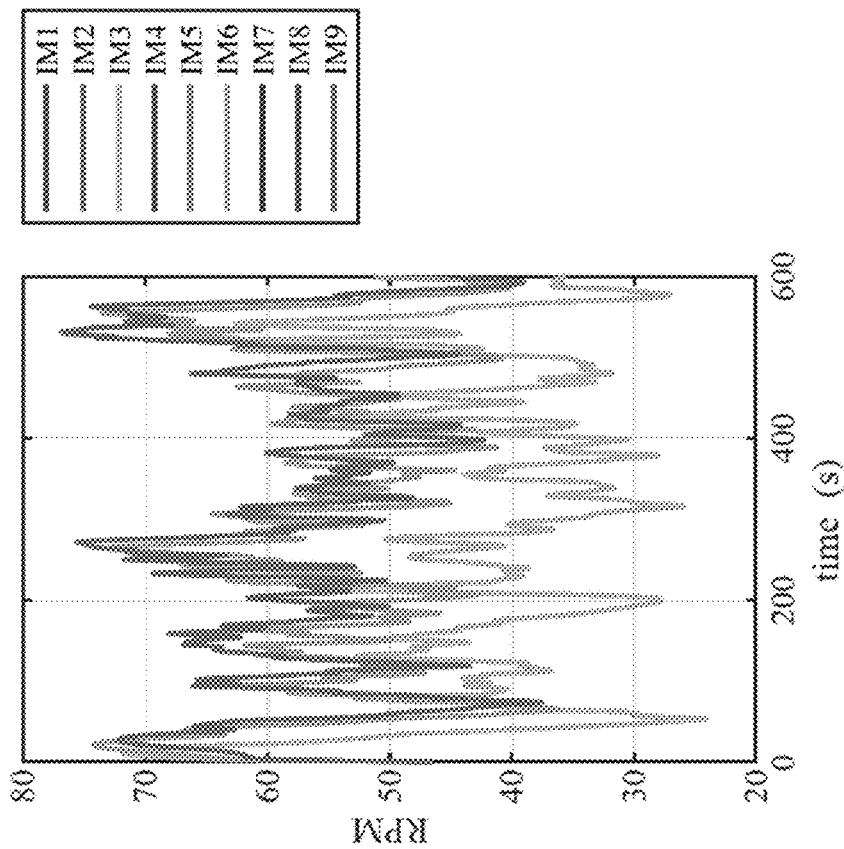
FIG. 5 is a graph of rotor RPMs for 0 sec. phase delay.

To demonstrate a baseline operation, a zero time/phase delay was simulated. The resulting rotor speeds $\omega_r$ for each turbine in RPM are shown in FIG. 5 and the DC currents $i_{dc}$ from the turbine/induction machines are shown in FIG. 6.

Figure 6:
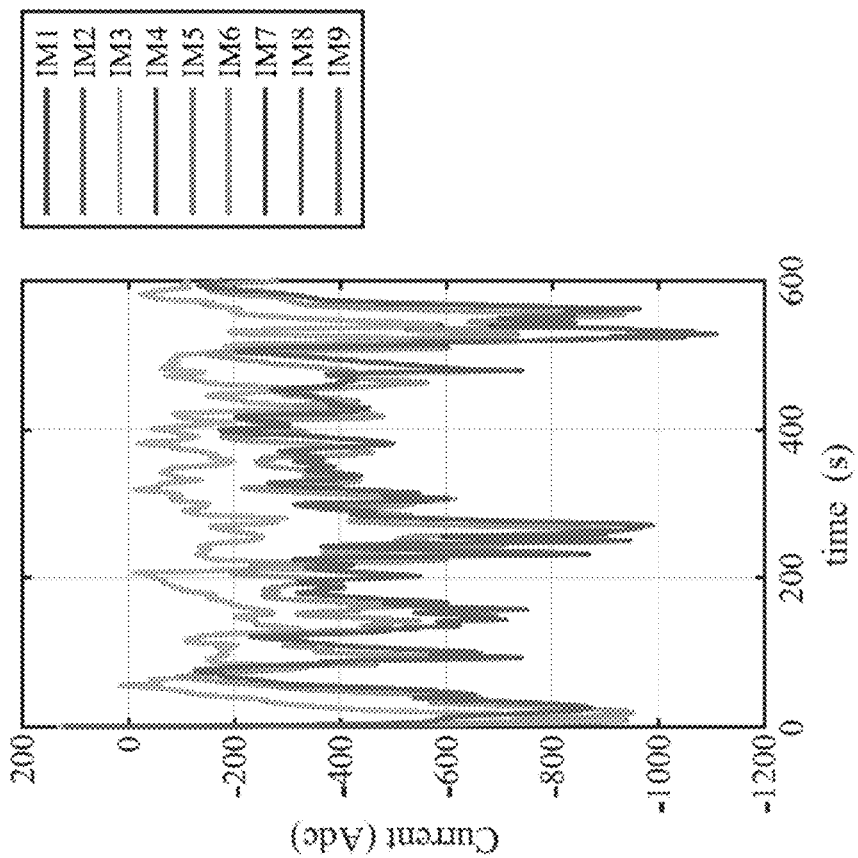
FIG. 6 is a graph of turbine DC currents to bus for 0 sec. phase delay.
Figure 8:
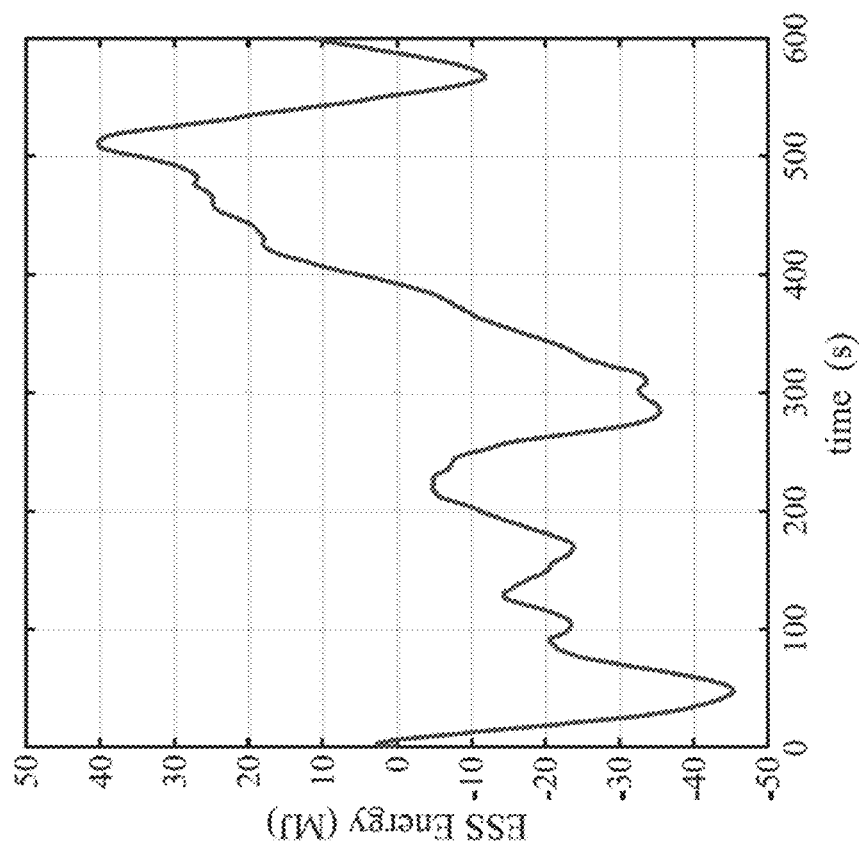
FIG. 8 is a graph of ESS total stored energy for 0 sec. phase delay.
Figure 7:
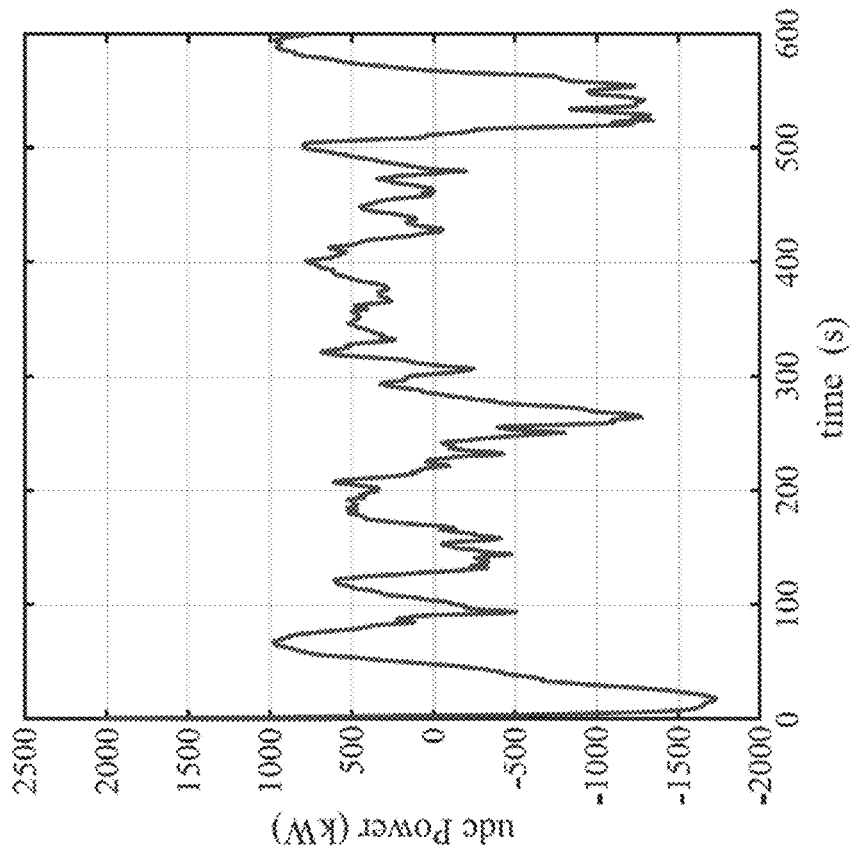
FIG. 7 is a graph of ESS power for 0 sec. phase delay.

Note, the negative sign convention in FIG. 6 denotes currents from the turbines to the DC collection bus. The DC collection bus was held at a constant 460 $V_{dc}$ and the current to the grid-connected converter was $i_{grid}=3308$ $A_{dc}$. The power and total energy injected by the ESS are shown in FIG. 7 and FIG. 8, respectively.

Time Delay Example of 32 sec

Figure 10:
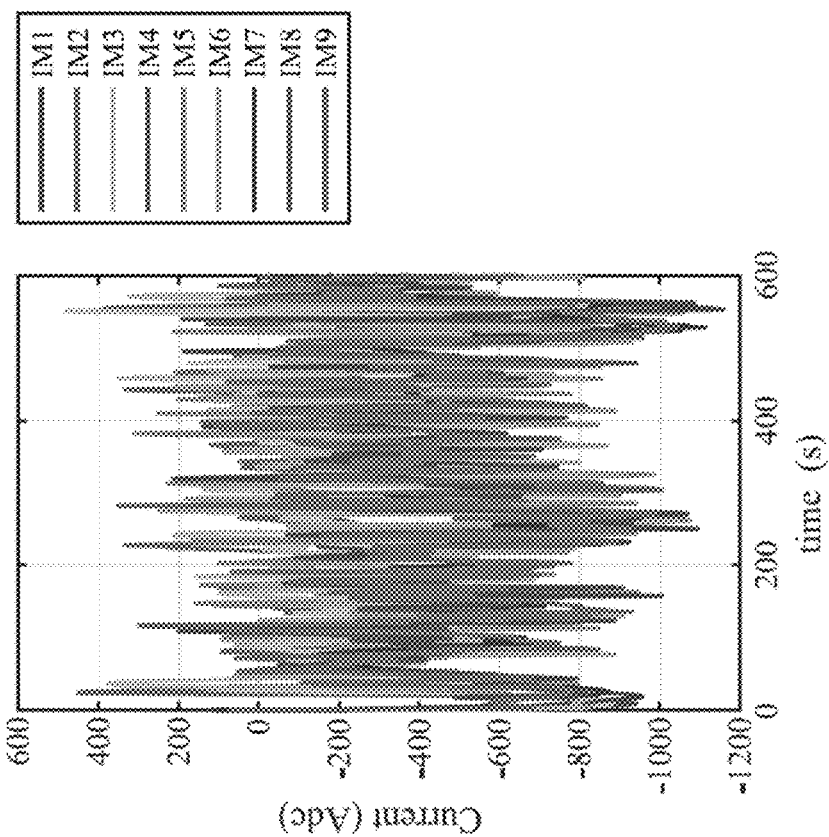
FIG. 10 is a graph of turbine DC currents for 32 sec. phase delay.
Figure 9:
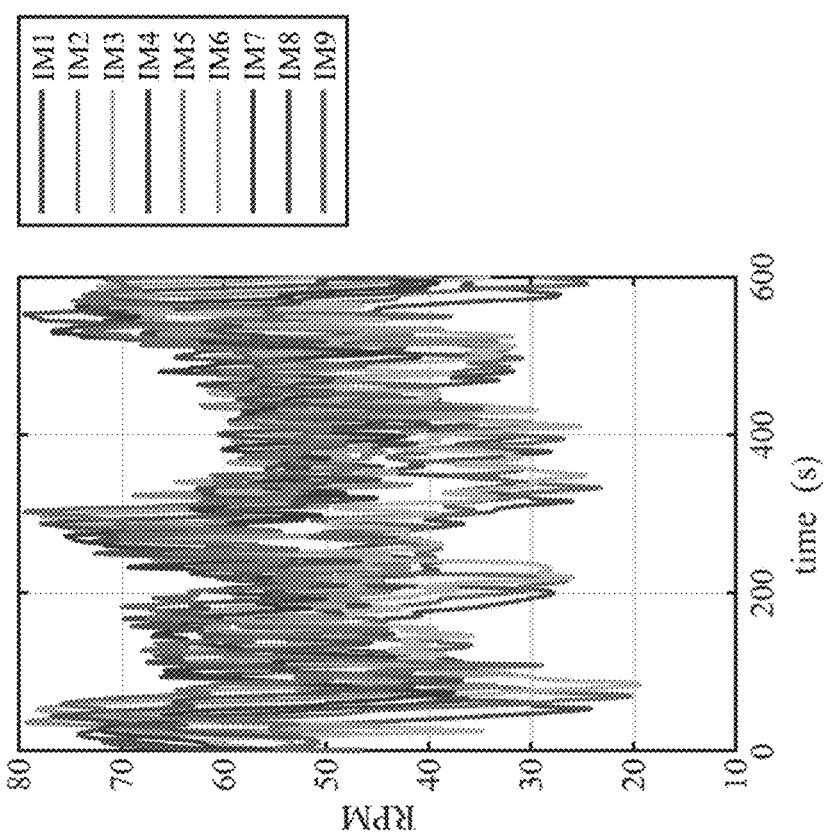
FIG. 9 is a graph of rotor RPMs for 32 sec. phase delay.
Figure 12:
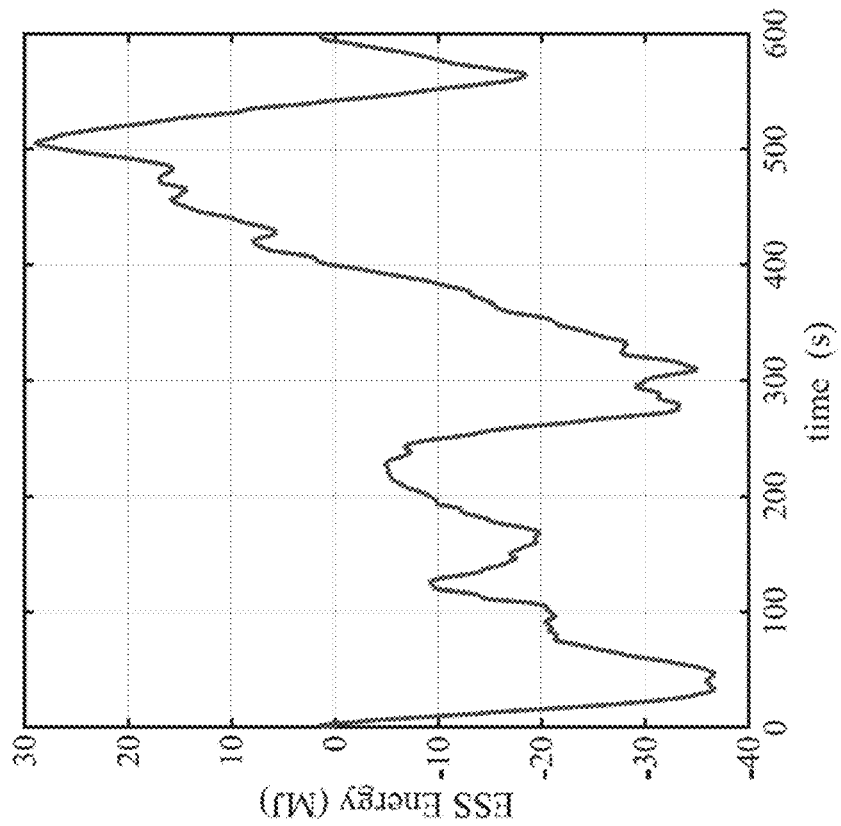
FIG. 12 is a graph of ESS total energy for 32 sec. phase delay.
Figure 11:
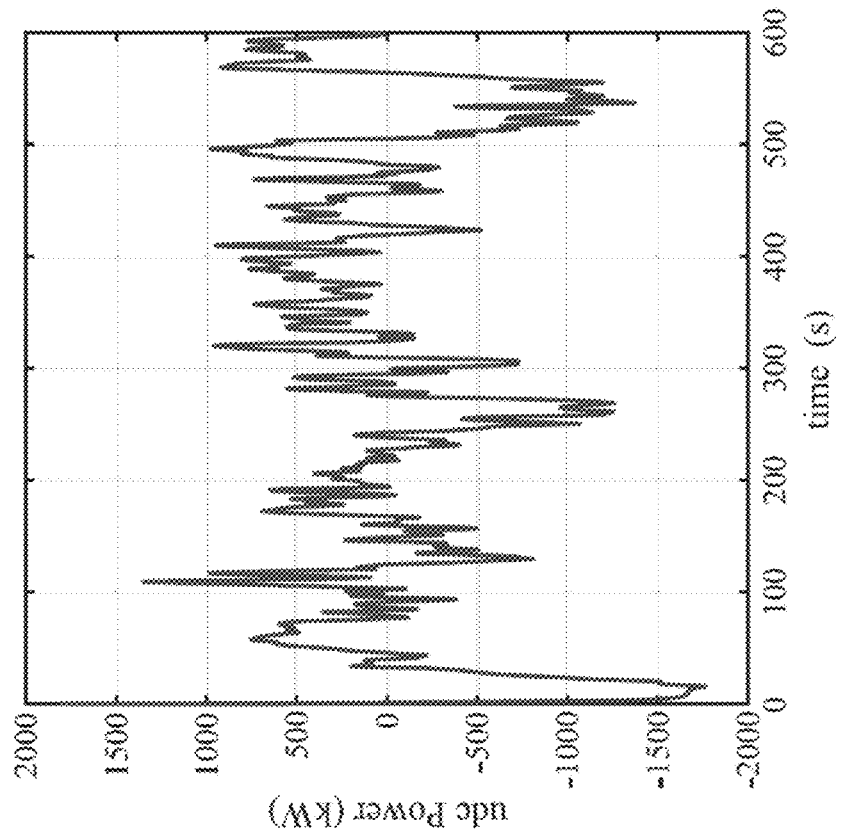
FIG. 11 is a graph of ESS power for 32 sec. phase delay.

To demonstrate the time delay phasing control, described in the Electrical Phasing Control section, a total time delay of 32 sec. was simulated. The resulting rotor speeds in RPM are shown in FIG. 9 and the DC currents from the turbine/induction machines are shown in FIG. 10. The DC collection bus was held at a constant 460 $V_{dc}$ and the current to the grid-connected converter was $i_{grid}=3173$ $A_{dc}$. The power and total energy of the ESS are shown in FIG. 11 and FIG. 12, respectively. Note that the DC currents from the nine turbines in FIG. 10 are more distributed over the 600 s simulation than the baseline case shown in FIG. 6. This enables the ESS to require less effort to maintain the 460 $V_{dc}$ bus voltage and thus use less power and require less energy storage. However, the trade-off is that now the power to the grid will be slightly diminished.

Overall Results

Figure 13:
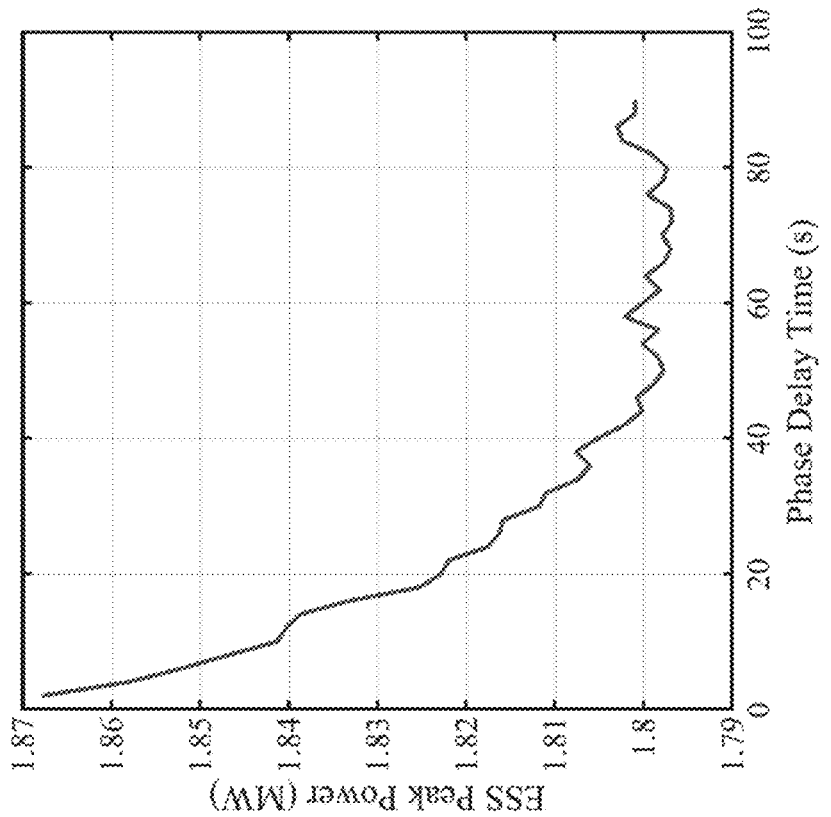
FIG. 13 is a graph of peak power of ESS vs turbine phase delay time.

A batch study was performed using the MATLAB/Simulink model. This study simulated the 600 sec. period 45 times and increased the phase time delay from 0 sec. to 90 sec. in 2 sec. increments. The resulting peak power required of the ESS is shown in FIG. 13, the required energy capacity of the ESS is shown in FIG. 14, and the average grid power is shown in FIG. 15.

Figure 14:
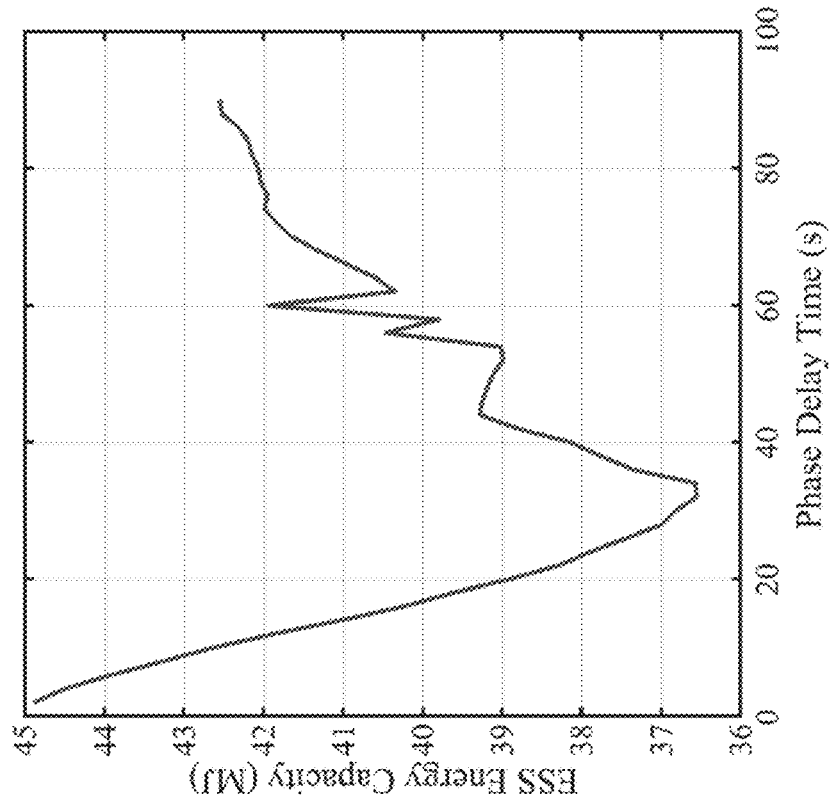
FIG. 14 is a graph of ESS energy capacity vs turbine phase delay time.
Figure 15:
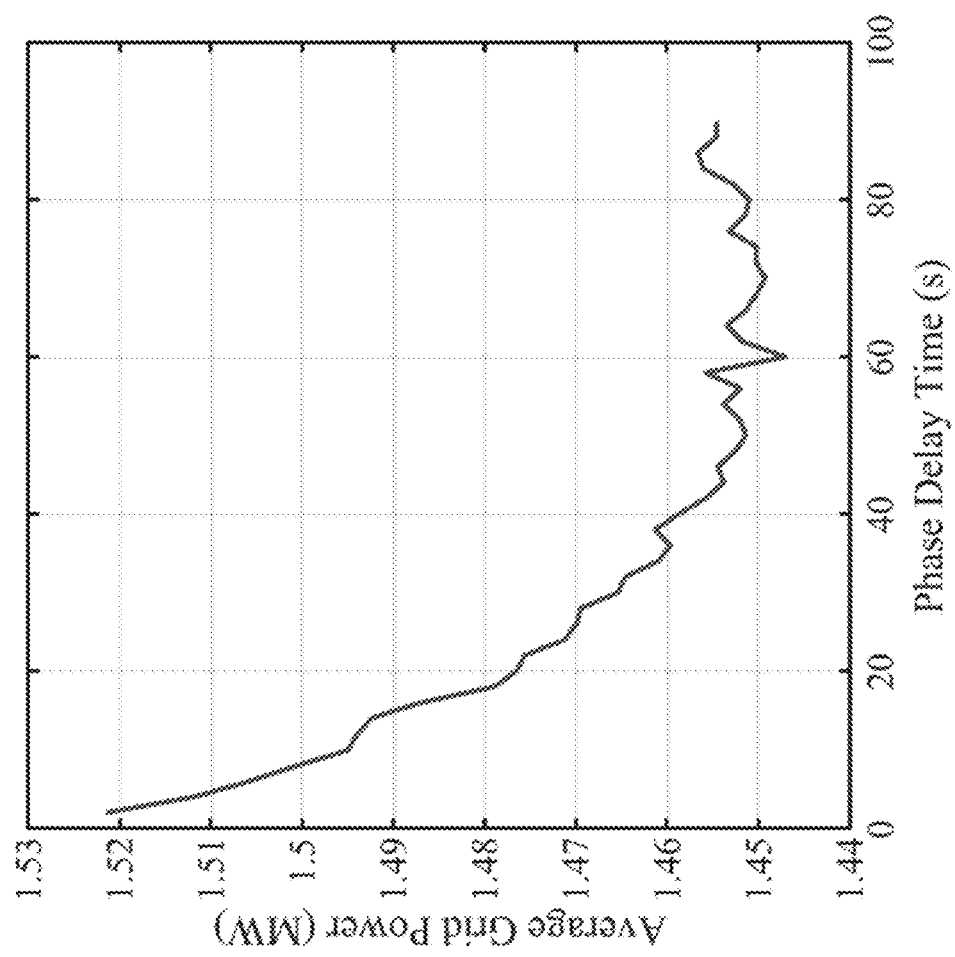
FIG. 15 is a graph of average power to the grid vs. turbine phase delay time.

It is seen in FIG. 14 that the minimum required energy storage capacity of the ESS is 36.6 MJ and occurs when the phase delay time is 32 sec. This is a 18.5% reduction in the capacity over the baseline case of 44.9 MJ. Further, in FIG. 13 it is seen that for a 32 s phase delay time, the peak power is reduced 3% down to 1.81 MW. The cost of implementing the phasing control and reducing the ESS power and energy requirements is that the average power to the grid is also reduced, but only by 3% to 1.46 MW as shown in FIG. 15. Therefore, with the DC collection bus and phasing control, significant reductions in the ESS size, weight and likely cost can be made at the expense of a small reduction in total power exported to the grid. Power quality to the grid will also be improved with a better regulated DC bus, which occurs with the ESS. See M. Singh et al., *IEEE Trans. Power Deliv.* 26(I), 307 (2011).

The present invention has been described as wind turbine power phase control with a DC collection bus for onshore/offshore windfarms. It will be understood that the above description is merely illustrative of the applications of the principles of the present invention, the scope of which is to be determined by the claims viewed in light of the specification. Other variants and modifications of the invention will be apparent to those of skill in the art.

We claim:
1. A wind farm, comprising:
    a plurality of wind turbines, each wind turbine comprising
        a rotor for capturing wind energy and converting the wind energy into a rotary motion,
        an electrical induction machine for converting the rotary motion to an alternating current,
        an AC/DC converter for converting the alternating current to a direct current, and a controller for controlling an individual time delay of the direct current from the wind turbine that is phased with respect to a time delay of a direct current from each of the other wind turbines of the plurality of wind turbines;

a DC collection bus for collecting the time-delayed direct current generated by each of the plurality of wind turbines that are phased over a total phase delay time of the plurality of wind turbines; and an energy storage system for regulating a voltage of the DC collection bus, wherein the total phase delay time of the plurality of wind turbines is selected to minimize an energy storage capacity required of the energy storage system for the DC collection bus to maintain a constant voltage.

2. The wind farm of claim 1, wherein the controller comprises a slip control to control an electrical torque of the electrical induction machine, thereby time delaying the direct current generated by the wind turbine that is injected into the DC collection bus.

3. The wind farm of claim 1, wherein the individual time delay of each wind turbine is equally shifted and spaced with respect to each of the other wind turbines over the total phase delay time.

4. A method for phase control of a wind farm, comprising:
providing the wind farm, comprising
a plurality of wind turbines, each wind turbine comprising
a rotor for capturing wind energy and converting the wind energy into a rotary motion,
an electrical induction machine for converting the rotary motion to an alternating current,
an AC/DC converter for converting the alternating current to a direct current, and
a controller for controlling an individual time delay of the direct current from the wind turbine that is phased with respect to a time delay of a direct current from each of the other wind turbines of the plurality of wind turbines;

a DC collection bus for collecting the time-delayed direct current generated by each of the plurality of wind turbines that are phased over a total phase delay time of the plurality of wind turbines; and an energy storage system for regulating a voltage of the DC collection bus; and selecting a total phase delay time for the plurality of wind turbines so as to minimize an energy storage capacity required of the energy storage system for the DC collection bus to maintain a constant voltage.

5. The method of claim 4, wherein the controller comprises a slip control to control an electrical torque of the electrical induction machine, thereby time delaying the direct current generated by the wind turbine that is injected into the DC collection bus.

6. The method of claim 4, wherein the individual time delay of each wind turbine is equally shifted and spaced with respect to each other wind turbines over the total phase delay time.

\* \* \* \* \*